United States Patent [19]

Wahl et al.

[11] 3,786,961

[45] Jan. 22, 1974

[54] SET RATE GRAVIMETRIC FEEDER

[76] Inventors: Eugene A. Wahl, 460 Ridgewood Ave., Glen Ridge; Cornelius Debonte, Jr., 1 Birch Rd., Little Falls; Ralph J. Winters, 138 Crestview Ave., Nutley, all of N.J.

[22] Filed: Oct. 5, 1972

[21] Appl. No.: 295,113

[52] U.S. Cl. .................... 222/55, 177/16, 177/121
[51] Int. Cl. ............................................ G01g 11/12
[58] Field of Search ................. 222/55; 177/16, 121

[56] References Cited
UNITED STATES PATENTS

| | | | |
|---|---|---|---|
| 3,412,699 | 11/1968 | Culp | 222/55 X |
| 3,087,652 | 4/1963 | Smith | 222/55 |
| 3,407,656 | 10/1968 | Chadenson | 222/55 X |
| 2,366,075 | 12/1944 | Weyandt | 222/55 |

Primary Examiner—Robert B. Reeves
Assistant Examiner—Thomas E. Kocovsky
Attorney, Agent, or Firm—Rudolph J. Jurick

[57] ABSTRACT

A set rate gravimetric feeder for use with particulate materials and comprising an endless belt mounted for pivotal displacement about a horizontal axis. Material from a hopper is delivered onto the belt and the weight of the material on the belt is sensed by a transducer which effects operation of a control system for automatically adjusting the belt speed to maintain a discharge of the material from an end of the belt at a pre-set rate.

8 Claims, 6 Drawing Figures

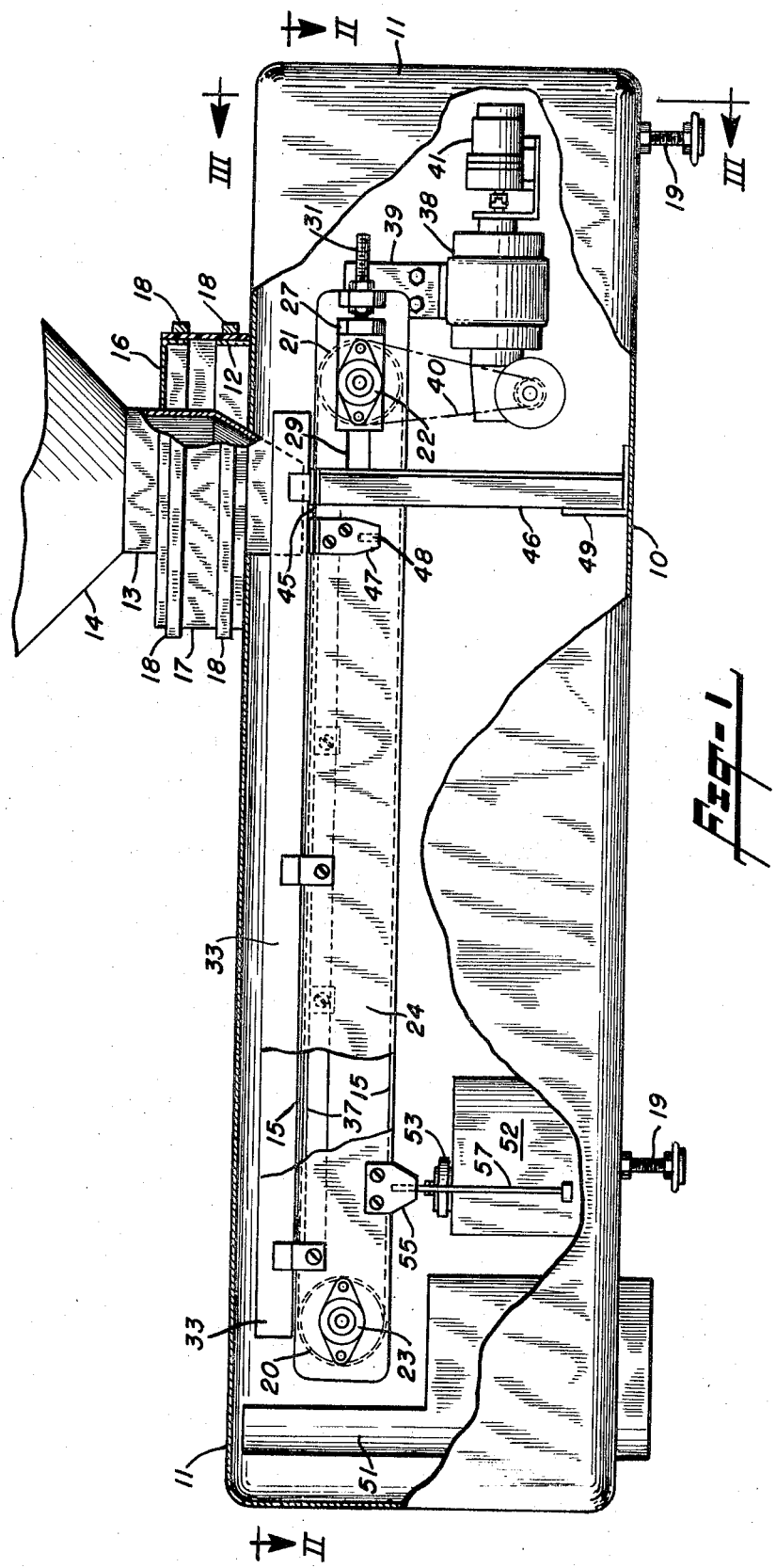

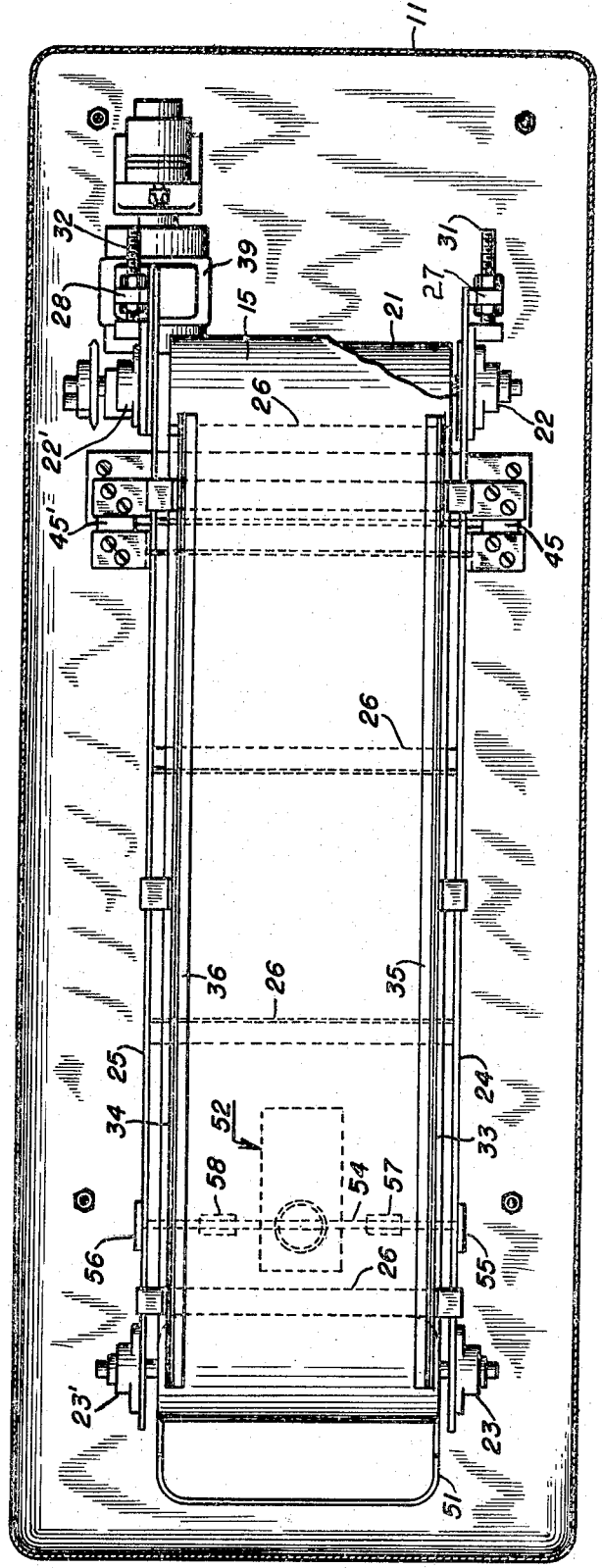

SET RATE GRAVIMETRIC FEEDER

BACKGROUND OF THE INVENTION

Material feeders are used to provide a continuous flow of material into a process at a constant, predetermined feed rate. Bulk materials present the problem of variables introduced into a process by changes in material bulk density and variations in flow rates. The changes in bulk density are generally caused by varying moisture content, the amount of entrained air, and/or variations in particle size. The material flow rates depend on the efficiency of the hoppering and discharge equipment and the flow characteristics of the materials. These problems are solved by gravimetric feeders which discharge material into process on a weight/time basis.

Gravimetric feeders fall into three general classes. 1)- Batch weighing feeders which feed material in a weigh hopper until a pre-set rate is reached, after which the supply is shut off and the weighed batch is transferred into a process. 2)- Continuous wild flow feeders in which all material flowing on a conveyor belt is continuously weighed as it passes over a weigh idler assembly. A totalizer records total material flow over a given time span. 3)- Continuous set rate feeders wherein material is discharged into a process in a continuous stream at a predetermined rate. The set rate feeders are preferred in many applications as they are capable of operating at a high accuracy and deliver material in a continuous stream at a desired uniform rate, thereby resulting in improved and repeatable uniformity of the end product.

A continuous flow, set rate feeder made in accordance with this invention is constructed and arranged to provide an improved operating stability and accuracy and is adapted for use with a wide variety of materials irrespective of whether the material is free-flowing, sluggish or sticky.

SUMMARY OF THE INVENTION

An endless belt, driven by a variable speed motor, is supported by a pair of spaced leaf springs lying in a plane containing the top portion of the belt. A spout, extending from a supply hopper, directs the flow of material onto the belt in the region of the leaf springs and the weight of the material on the belt is sensed by a load cell which is flexibly coupled to the belt system. The load cell provides a monitoring signal which effects operation of circuitry to adjust the belt speed in accordance with the deviation of the material discharge rate from a pre-set rate. Read-out means are provided to provide a continuous reading of the material discharge rate and the total weight of the material discharged.

An object of this invention is the provision of a gravimetric feeder having improved operating stability and accuracy.

An object of this invention is the provision of a continuous flow, set-rate gravimetric feeder in which an endless belt is supported by a pair of spaced leaf springs and driven by a variable speed motor, said leaf spring being positioned to eliminate displacement of the belt due to forces which may be developed as the belt withdraws material from a spout having an end presented to the belt.

An object of this invention is the provision of a continuous flow, set-rate gravimetric feeder having an endless belt mounted for pivotal movement about a horizontal axis and receiving material from a hopper, and a load-cell responsive to the weight of the material on the belt, said load cell being coupled to the belt system in such manner that the direction of forces applied thereto by the belt system is at all times axial to the load cell.

An object of this invention is the provision of a belt feeder for providing a continuous discharge of material at a pre-set rate, which feeder includes an endless belt driven by a variable speed motor and positioned to receive material from a supply hopper, means providing a reference voltage corresponding to the pre-set rate of the feeder, means providing a second voltage which varies in magnitude with the actual feed rate, and means for adjusting the speed of the motor in accordance with the difference between the reference and second voltage.

The above-stated and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

BRIEF DESCRIPTION OF THE DRAWINGS

In the drawings wherein like reference characters denote like parts in the several views;

FIG. 1 is a side elevational view of a feeder made n accordance with one embodiment of the invention, a major portion of the housing side wall being broken away;

FIG. 2 is a sectional view taken along the line II — II of FIG. 1 but with the supply hopper omitted;

DESCRIPTION OF PREFERRED EMBODIMENTS

Figure 3:
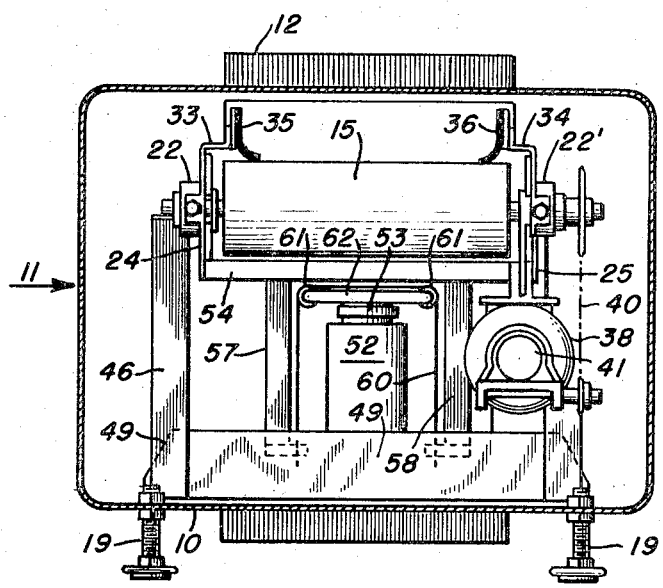
FIG. 3 is a sectional view taken along line III — III of FIG. 1.

Referring to FIGS. 1 – 3, the feeder is mounted on a base plate 10 and is enclosed within a housing 11. The top wall of the housing has a circular opening formed therein, which opening is circumscribed by a collar 12 welded to the housing. Projecting through this opening is a spout 13 extending from a supply hopper 14, the end of the spout being spaced from an endless belt 15. The upper portion of the spout is of square cross-sectional whereas the lower portion of the spout has a rear wall sloping toward the spout axis, thereby resulting in a rectangular cross-sectional configuration presented to the belt surface. A closure member 16, secured to the spout, has a side wall space from the collar 12. This space is closed by a flexible sleeve 17 secured in place by a pair of metal straps 18, thereby forming a dust shield. The apparatus is supported on a suitable platform by four adjustable feet 19, whereas the hopper is supported on such platform, or on the floor, by separate legs, not shown.

The endless belt 15, preferably having a Teflon-coated outer surface, passes around a pair of pulleys 20 and 21, said pulleys having rubber-coated surfaces to prevent belt slippage. The pulleys have shafts rotatable in aligned sets of bearings 22, 22' and 23, 23'. These bearings are carried by a pair of vertically-disposed frame members 24 and 25 secured together by a plurality of struts 26 to form a rigid structure. The bearings 22 and 22' are secured to the respective slide blocks 27 and 28 mounted for sliding movement along aligned slots formed in the frame members, the slot in the frame member 24 being visible in FIG. 1 and identified by the numeral 29. Adjusting screws 31 and 32 have ends threaded in holes formed in the slide blocks 27, 28, respectively. These screws also pass through threaded holes formed in associated blocks secured in fixed position on the frame members, the described arrangement providing means for adjusting the tension of the belt.

A pair of guide rails 33 and 34 are secured to the frame members 24 and 25, respectively, each guide rail having an offset central portion positioned above the upper surface of the endless belt (see FIG. 3). Secured to these guide rails are a pair of said guides 35 and 36, made of a suitable flexible material, such as neoprene, and being in contact with the belt surface. Underlying the upper portion of the belt is a flat plate 37 having downturned sides which are secured to the vertical frame members 24 and 25. This plate has a longitudinal length somewhat less than the spacing between the belt pulleys and supports the upper portion of the belt in a mono-planar disposition. A d.c. motor 38 is mounted on a bracket 39 secured to and extending downwardly from the frame member 25. The motor includes a gear reduction unit having an output shaft coupled to pulley 21 by a chain drive 40 and cooperating sprocket wheels. A d.c. tachometer 41, supported on a bracket secured to the motor housing, has its armature connected to the motor drive shaft by a flexible coupling.

The described weigh belt assembly is pivotally supported by a pair of leaf springs 45, 45' lying in the plane containing the top portion of the endless belt 15. Referring to the leaf spring 45, one end portion of the spring is securely clamped between a pair of flat plates secured to the upper end of a post 46 which extends upwardly from the base plate 10. The other end portion of the leaf spring is securely clamped between a pair of flat plates secured to the bracket 47 which is bolted to the frame member 24. The other leaf spring 45' is similarly secured in place. A strut 48 (FIG. 1) is welded to the bracket 47 and to the corresponding bracket associated with the other leaf spring 45'. The lower end of the post 46 is welded to an L-shaped bracket 49, which bracket extends across the base plate and is also welded to the corresponding post associated with the other leaf spring 45'. The upper portions of these posts are also connected together by a strut, not shown.

When the apparatus is in operation, material from the hopper is deposited onto the endless belt, transported to the left and drops through the chute 51 secured to the base plate 10. The described rigid structures associated with the leaf springs assures pivotal movement of the weigh belt system about a horizontal axis lying within the unconfined portions of the leaf springs. The positioning of the leaf springs in the plane containing the top portion of the belt eliminates undesirable angular movement of the system due to the resistance force which may be developed on the belt as the material is dragged from spout 13. Pivotal movement of the belt is sensed by a load cell 52 having an address button 53. Positioned below the belt is a strut 54 having ends welded to a pair of support plates 55 and 56, which plates are secured to the frame members 24 and 25, respectively. A pair of rigid arms 57 and 58 are welded to the strut 54, said arms spanning the load cell, as seen in FIG. 3 to which specific reference now is made. A flexible wire 60 passes over a pair of pulley wheels 61 carried at the ends of an operating bar 62 which is secured to the address button 53. The ends of this wire are secured to the projecting end portions of tabs secured to the ends of the arms 57 and 58. The described flexible coupling of the weigh belt system to the address button prevents lateral forces from acting on the load cell. Consequently pivotal movement of the weigh belt system results in the application of forces to the load cell only in a direction along the axis of the address button, which is highly desirable in a feeder which is to operate at highly accurate feed rates. The load cell is of conventional construction including a tare spring to adjust for the weight of the belt system. Preferably, the tare spring is adjusted so that the load cell is preloaded, thereby to prevent bouncing of the belt system and resulting in stability of operation.

All of the material carried on the belt is sensed by the load cell which produces a continuous output signal for controlling the speed of the motor driving the belt, thereby to maintain a continuous discharge of the material at a pre-set rate, as will be described hereinbelow. In the case of free-flowing materials, the illustrated hopper arrangement is satisfactory for maintaining a continuous flow of material to the belt.

Figure 4:
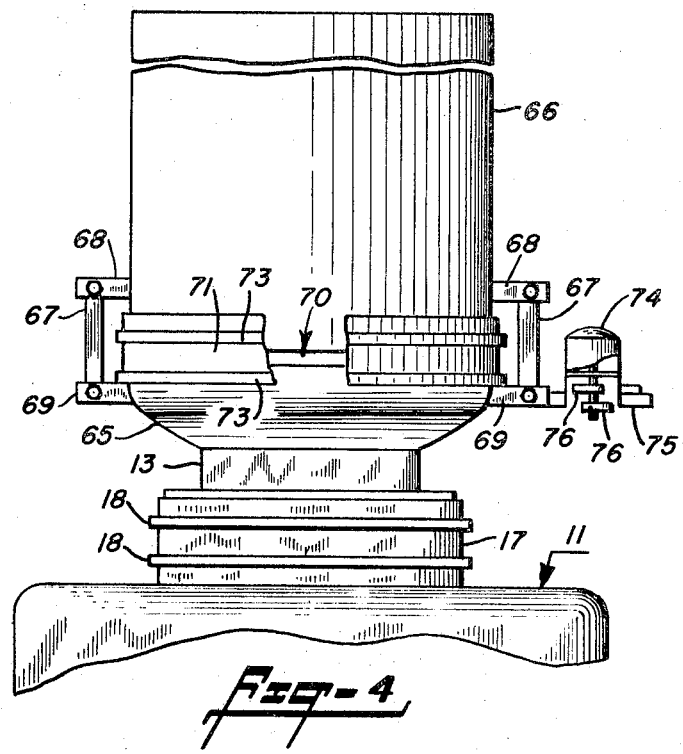
FIG. 4 is a fragmentary side elevational view showing a feeder made in accordance with another embodiment of the invention.

FIG. 4 illustrates a hopper arrangement for use with flaky or sluggish materials. Here, the spout 13 extends from a concave member 65 which is suspended from the open bottom of a hopper 66 by a plurality of suspension mountings 67. The upper ends of these mountings are bolted to the brackets 68 welded to the hopper and the lower ends of the mountings are bolted to similar brackets 69 welded to the conical member 65. The upper end portion of the conical member has a uniform diameter corresponding to that of the hopper. The space 70 is closed by a flexible band secured in place by metal straps 73. An electro-mechanical gyrator 74 is bolted to a rigid plate 75 which is welded to the conical member 65. The gyrator has eccentrically-mounted weights 76 secured to the drive shaft of an electric motor. When the motor is energized the weights rotate in a horizontal plane, thereby imparting vigorous, orbital vibrations to the conical member and the spout secured thereto, resulting in a continuous flow of material from the hopper onto the endless belt of the weighing system.

Figure 5:
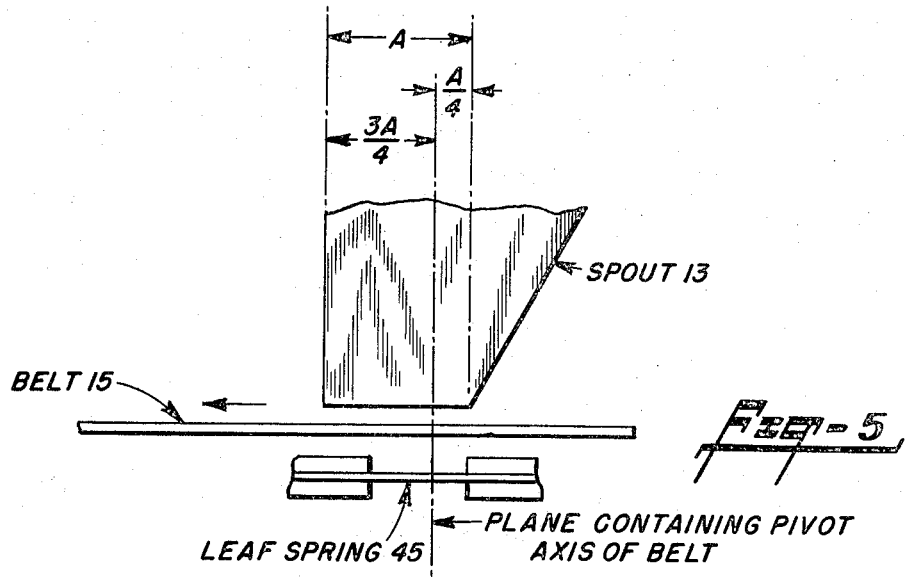
FIG. 5 is a diagrammatic representation showing the position of the spout outlet with reference to the pivot axis of the weigh belt system.

Referring again to FIG. 1, the end of the spout 13 has a rectangular cross-sectional configuration and is disposed directly over the leaf springs. The length of the spout opening is less than the width of the endless belt and the material being transported by the belt will have a height substantially equal to the spacing of the spout end from the belt surface. Such material will have the cross-sectional configuration of a truncated cone, with an apex equal to the length of the spout opening and a base having a width depending upon the angle of repose of the particular material, but such base width is at all times less than the spacing between the flexible guides 35 and 36. In order to eliminate the effect of the material head load and the effect of material drag as the material is moved out of the spout by the belt, the spout is so positioned that the vertical plane containing the pivot axis of the belt system passes through a line located from the forward edge of the spout at a distance approximately equal to three-quarters of the spout width, as shown in FIG. 5 wherein the spout width is identified by the letter A. In such arrangement, the weight of the material in the spout does not effect the output of the load cell.

Figure 6:
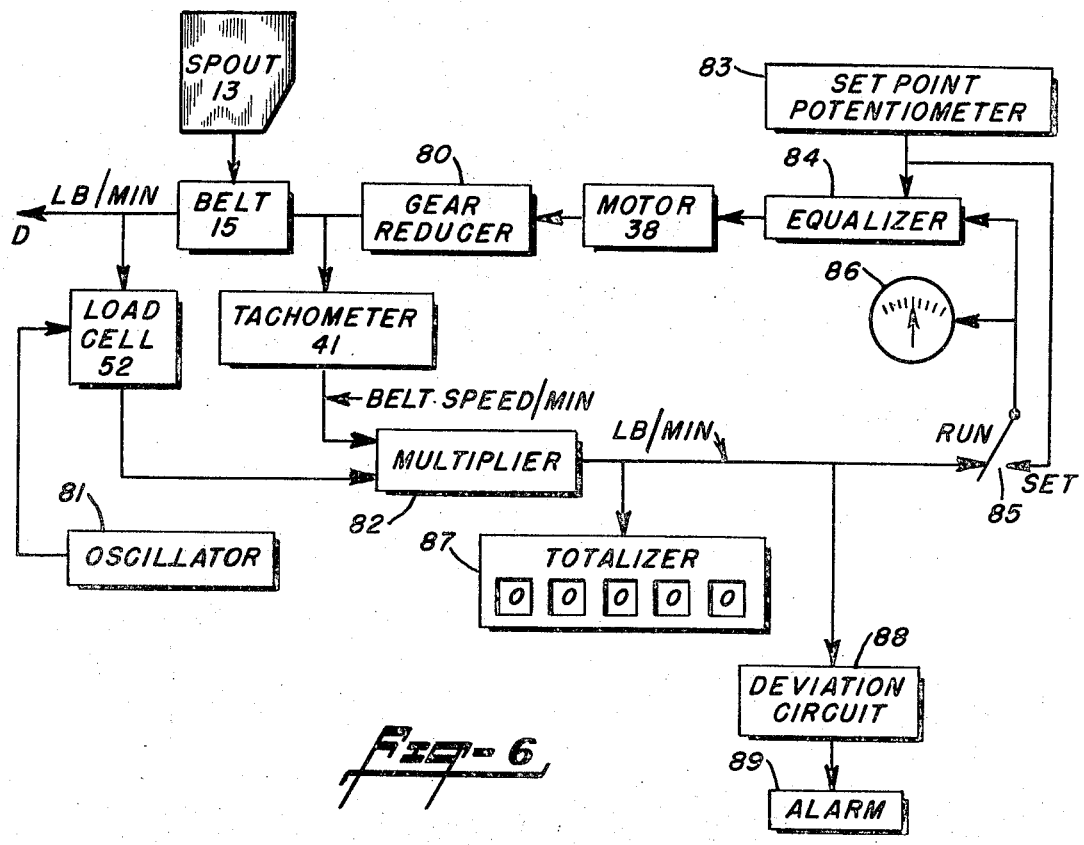
FIG. 6 is a block diagram of the control system.

A block diagram of the control system is shown in FIG. 6. Material is deposited onto the belt 15 through the spout 13. The motor 38 drives the belt through the gear reducer 80 and the material is discharged into process at the point D. The weight of the material on the belt is sensed by the load cell 52, which is a linear voltage differential transformer energized by an oscillator 81 operating at 2,500 Hz. The load cell includes means to tare out the weigh belt mechanism and produces an output signal proportional to only the weight of the material on the belt. The tachometer 41 produces a voltage proportional to belt velocity. This output and that from the load cell are applied to a multiplier 82. These two outputs are expressed by: Pounds/minute = K (load cell output)
multiplied by (tachometer output) The constant K takes into consideration the configuration of the spout, motor to belt linear speed ratio, and the load cell sensitivity. The multiplier 82 is a solid-state device and performs the multiplication. It operates on the principle of triangle averaging, using the mathematical relationship of quarter square multiplication, wherein one quarter of the difference of two squares equals the product of V (belt velocity) X W (material weight). The multiplier produces an output voltage proportional to the weight of the material delivered per unit of time and is used for comparison with the desired or set rate. The desired rate is established by a manually adjustable set point potentiometer 83 which applies a constant voltage of predetermined magnitude to the equalizer 84. When the manually operable switch 85 is closed to the SET position, the output voltage of the potentiometer also is applied to a meter 86 having a scale calibrated in pounds/minute, thereby providing a visual indication of the desired feed rate. When this switch is set to the illustrated RUN position, the output voltage of the multiplier 82 is applied to the meter which now indicates the actuate delivery rate.

The equalizer 84 senses the command (desired feed rate) and compares it to the feedback signal from the multiplier 82 (actual rate). The resultant error or difference signal is dynamically modified in the equalizer, which not only performs the substractive function necessary for correction but, also, is frequency or response-rate conscious. The drive motor 38 completes the control loop through power amplification of the equalizer output, which is used to drive the gear reducer in accordance with signal intelligence from the equalizer. A totalizer 87 integrates the information derived from the multiplier and provides a visual indication of the total material weight delivered by the system. The deviation circuit, settable for high and low limits about the set delivery rate, actuates an alarm 89 when unusual disturbances occur in the system. These disturbances would be associated with an empty supply hopper, material flow stoppages or start-up transients.

The described apparatus is capable of operating at an overall accuracy of ±0.5 to ±0.25 percent of the set rate at 2 sigma for most materials. Sigma, as used in accuracy statements, refers to the standard deviation developed by repetitive sampling is mathematically presented as: Sigma = $\sqrt{\Sigma(d^2)/N}$ where, d = individual deviations of repetitive samples, and N = the number of samples. An accuracy of ± ½ percent at 1 sigma indicates that approximately 65 percent of all sample weighments checked will be within ± ½ percent of the mean or set rate. For an accuracy of ± ½ percent at 2 sigma, approximately 95 percent of the sample weighments will be within ± ½ percent of the set rate.

Having now described the invention what we desire to protect by letters Patent is set forth in the following claims.

1. Apparatus comprising,
   a- a weigh belt system including a horizontally-disposed endless belt mounted between spaced pulleys, and a variable speed motor coupled to one of the pulleys,
   b- a pair of leaf springs Supporting the said system for pivotal displacement about a horizontal axis,
   c- a load cell coupled to the weigh belt system and providing an output signal in correspondence with pivotal displacement of said system, said load cell having an address button positioned below the said weigh belt system,
   d- a pair of pulley wheels rotatably mounted on the end portions of a rigid bar secured to the address button,
   e- a pair of arms secured to the weigh belt system and spanning the load cell,
   f- a flexible member passing over the said pulley wheels and having its' ends secured to the free ends of the said arms, and
   g- means controlling the speed of said motor in correspondence with the said output signal.

2. The invention as recited in claim 1, wherein said leaf springs are disposed on either side of the weigh belt system and lie in a plane containing the top portion of said belt.

3. The invention as recited in claim 1, including a spout for directing the flow of material onto the belt, said spout having a discharge opening of rectangular cross-sectional configuration and spaced from the belt surface.

4. The invention as recited in claim 3, wherein the said leaf springs are disposed on either side of the weigh belt system and lie in the plane containing the top portion of the belt, and wherein a vertical plane containing the pivot axis of the weigh belt system passes through the discharge opening of the spout.

5. The invention as recited in claim 4, wherein the said vertical plane passes through the spout discharge opening along a line located substantially 3 A/4 from the front wall of the spout, A being the width of the spout opening taken longitudinally of the belt.

6. The invention as recited in claim 5, including means for vibrating said spout in a substantially horizontal plane.

7. A set rate weigh belt feeder comprising,
   a- a frame carrying a pair of spaced pulleys,
   b- a horizontally-disposed endless belt passing over said pulleys, c- a variable speed motor carried by the frame and coupled to one of the pulleys, d- a tachometer carried by the frame and coupled to said motor, said tachometer producing a first voltage which varies in correspondence with the linear speed of the belt, e- a pair of leaf springs disposed on either side of the frame and supporting the frame for pivotal displacement about a horizontal axis, said leaf springs lying in the plane containing the top portion of the belt, f- means for directing the flow of material onto the top portion of the belt in the region of the leaf springs, g- a load cell for producing a second voltage which varies in correspondence with the weight of material on the belt, said load cell having an address button, h- a pair of pulley whels rotatably carried at the ends of a rigid bar secured to said address button, i- a pair of vertical arms spanning the said rigid bar and having upper ends secured to the said frame, j- a flexible wire passing over the said pulley wheels and having ends secured to the other ends of said vertical arms, k- means multiplying the said first and second voltages to produce a third voltage, which third voltage corresponds to the weight of material discharged by the belt per unit time, l- means providing a reference voltage corresponding to a predetermined set rate of the feeder, m- means comparing the said reference voltage with the said third voltage, and n- means changing the speed of the said motor in accordance with the difference between the said reference and third voltages.

8. The invention as recited in claim 7, including an electro-mechanical gyrator carried by a concave member which terminates in said spout, said gyrator including eccentrically-mounted weights imparting horizontal vibrations to the conical member and spout when the gyrator is energized.

* * * * *